(12) United States Patent
Ellis et al.

(10) Patent No.: US 12,454,979 B2
(45) Date of Patent: Oct. 28, 2025

(54) SELF-LUBRICATING PIN

(71) Applicants: SAFRAN LANDING SYSTEMS, Velizy-Villacoublay (FR); SAFRAN LANDING SYSTEMS CANADA INC., Ajax (CA)

(72) Inventors: Andrew Michael Ellis, Guelph (CA); Aakash Gohil, Toronto (CA); Graeme Peter Arthur Klim, Velizy-Villacoublay (FR)

(73) Assignees: SAFRAN LANDING SYSTEMS, Velizy-Villacoublay (FR); SAFRAN LANDING SYSTEMS CANADA INC., Ajax (CA)

( * ) Notice: Subject to any disclaimer, the term of this patent is extended or adjusted under 35 U.S.C. 154(b) by 278 days.

(21) Appl. No.: 17/934,768

(22) Filed: Sep. 23, 2022

(65) Prior Publication Data
US 2024/0102513 A1    Mar. 28, 2024

(51) Int. Cl.
*F16C 11/04* (2006.01)
*B64C 25/32* (2006.01)
*F16C 33/10* (2006.01)

(52) U.S. Cl.
CPC .......... *F16C 33/1025* (2013.01); *B64C 25/32* (2013.01); *F16C 11/045* (2013.01); *Y10T 403/32918* (2015.01); *Y10T 403/32926* (2015.01)

(58) Field of Classification Search
CPC ................ F16C 11/045; F16C 11/068; Y10T 403/32861; Y10T 403/32918; Y10T 403/32926
See application file for complete search history.

(56) References Cited

U.S. PATENT DOCUMENTS

| | | | | |
|---|---|---|---|---|
| 3,210,137 A | * | 10/1965 | Williams | F16C 33/102 184/5 |
| 3,586,129 A | * | 6/1971 | Cass | F16N 37/003 417/469 |
| 4,113,061 A | * | 9/1978 | Peaster | F16N 11/04 184/45.1 |
| 6,739,786 B2 | * | 5/2004 | Reniau | F16C 33/102 403/123 |

(Continued)

FOREIGN PATENT DOCUMENTS

CA    3 002 061 A1    10/2018

*Primary Examiner* — Michael P Ferguson
(74) *Attorney, Agent, or Firm* — Christensen O'Connor Johnson Kindness PLLC (57) ABSTRACT

A pin for a pinned joint includes a hollow body with a first and second end caps coupled to first and second ends, respectively. The body and the end caps at least partially define a cavity within the body, wherein at least one aperture extends through the hollow body. A main piston is slidably disposed within the cavity and divides the cavity into a first chamber proximate to the first end and a second chamber proximate to the second end and fluidly isolated from an environment around the body. A lubricant is disposed within the first chamber. The main piston moves toward the first end of the body when a pressure in the second chamber is greater than a pressure of the environment. Movement of the main piston toward the first end of the body discharges lubricant through the at least one aperture.

16 Claims, 8 Drawing Sheets

(56) References Cited

U.S. PATENT DOCUMENTS

| | | | |
|---|---|---|---|
| 6,869,244 B2 * | 3/2005 | Anderton | B62D 55/21 |
| | | | 403/150 |
| 10,731,699 B2 * | 8/2020 | Renaud | E02F 9/006 |
| 11,377,206 B2 | 7/2022 | Amberg et al. | |

* cited by examiner

SELF-LUBRICATING PIN

BACKGROUND

Figure 1:
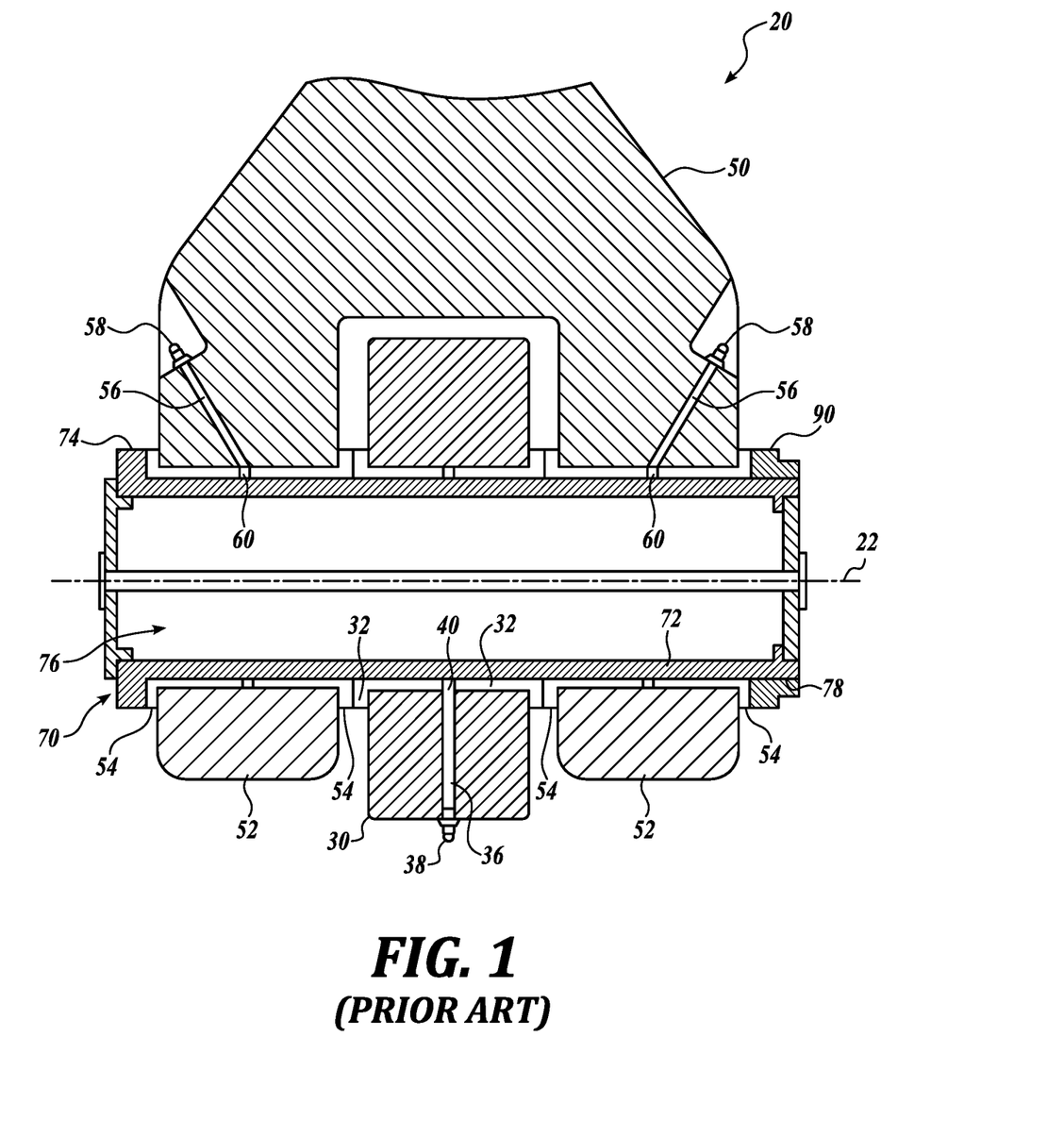
FIG. 1 is a cross-sectional view through the axis of a known rotatable pinned joint.
Figure 2:
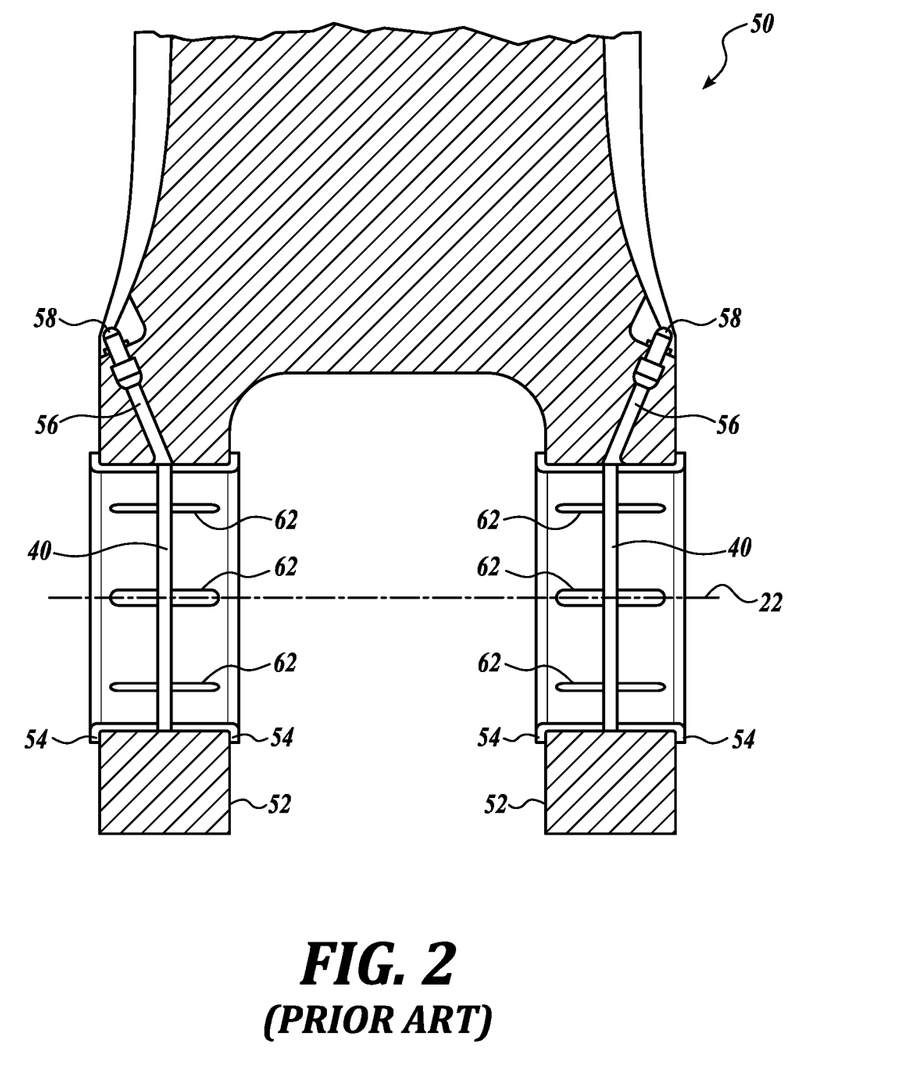
FIG. 2 is a cross-sectional view of the clevis of the rotatable pinned joint shown in FIG. 1.

Rotatable joints often utilize pinned connections to provide relative rotation between components of various structural assemblies. An exemplary embodiment of such a rotatable joint is shown in FIGS. 1 and 2. The joint 20 includes a lug 30 of a first element that is rotatably coupled to a clevis 50 of a second element about an axis 22. More specifically, a pin 70 extends through bushed holes in the lug 30 and the clevis 50 so that the first and second elements are rotatably relative to each other about the axis 22 of the pin 70.

The pin 70 includes an elongate hollow body 72 that has an inner cavity 76. A flange 74 extends radially from one end. The second end includes threads 78 configured to threadedly engage a nut 90 so that the flange 74 and the nut 90 secure the pin 70 to the joint 20.

The lug 30 includes an aperture with a flanged bushing 32 mounted to each end of the aperture. The bushings 32 are sized and configured such that a gap 40 exists between the interior ends of the bushings when mounted to the lug 30. A grease path 36 extends from an external surface of the lug 30 to the gap 40 formed between the bushings 32. A grease fitting 38 is mounted to the external end of the grease path 36 to allow grease to be provided to the pin 70 through the grease path 36 and the gap 40 between the bushings 32.

The clevis 50 includes a pair of offset lugs 52 configured to receive the lug 30 therebetween. Each lug 52 includes an aperture with a flanged bushing 54 mounted to each end of the aperture. The bushings 54 are sized and configured such that a gap 60 exists between the interior ends of the bushings when mounted to their respective lug 52. A grease path 56 extends from an external surface of each lug 52 to the gap 60 formed between the bushings 54. A grease fitting 58 is mounted to the external end of the grease path 56 to allow grease to be provided to the pin 70 through the grease path 56 and the gap between the bushings 54.

Referring specifically to FIG. 2, a cross-sectional view of the clevis 50 is shown. The gap 40 between the bushings 54 extends circumferentially around the corresponding lug 52 of the clevis 50. Each bushing 54 includes a plurality of grooves 62 extending laterally from the gap 40, i.e., from the end of the bushing 54 disposed within the lug 52.

Referring again to FIGS. 1 and 2, to lubricate the joint 20, an operator introduces grease or another suitable lubricant into the grease fitting 58 on each lug 52. The grease passes through the grease path 56 into the gap 40 between the bushings 54. The grease moves circumferentially around the pin 70 within the gap 40 and also flows into the lateral grooves 62 of each bushing 54. The grease in the gap 40 and the lateral grooves 62 is in contact with the pin 70 and is distributed along the interface of the bushings 54 with the pin 70 by rotation of the bushings relative to the pin about the axis 22. The bushings 32 of the lug 30 shown in FIG. 1 are similarly configured to allow lubrication of the interface of the bushings with the pin 70.

Rotatable joints, such as the one shown in FIGS. 1 and 2 are often utilized in deployable landing gear systems for vehicles. The ability of various landing gear components to rotate relative to each other makes it possible for the landing gear assembly to reciprocate between a stowed position and a deployed position. Deployable landing gear systems are commonly used on aircraft. When the landing gear assemblies are deployed, the landing gear assemblies support the aircraft to enable the aircraft to taxi, takeoff, and safely land on the ground. In flight, the landing gear assemblies move to the stowed position to reduce drag.

Similarly, magnetically levitated ("maglev") transportation systems, such as Hyperloop vehicles, utilize landing gear assemblies that reciprocate between stowed and deployed position. Maglev vehicles typically include one or more pressurized capsules to carry passengers and/or cargo through evacuated, i.e., low pressure, tubes. When traveling at high speeds, the vehicles are levitated by magnetic fields, compressed air, or other suitable means. When traveling at low speeds or stopped, the vehicles do not levitate, but are instead supported by a support system that includes a plurality of independently controlled landing gear assemblies. Like aircraft landing gear, the maglev landing gear assemblies reciprocate between an extended (deployed) position and retracted (stowed) position by extending and retracting the individual landing gear assemblies.

An example of a retractable landing gear assembly suitable for use with an aircraft or a maglev vehicle is disclosed by U.S. Pat. No. 10,933,983, which is currently assigned to Safran Landing Systems Canada Inc., the disclosure of which is incorporated by reference herein. The landing gear assembly includes several pinned joints configured for rotational movement between various landing gear components.

In order to reduce friction and wear of landing gear components, pinned joint components are typically lubricated at regular intervals. Vehicle downtime related to such maintenance results in unwanted expense as the vehicles are taken out of service to conduct such maintenance.

SUMMARY

The present disclosure provides examples of a self-lubricating pin, such as a pin used in a pinned connection for a landing gear joint. In an embodiment, the pin comprises a hollow body with a first end cap that is coupled to a first end of the body and a second end cap that is coupled to a second end of the body. The body and the first and second end caps at least partially define a cavity within the body. At least one aperture extends through the body. A main piston is slidably disposed within the cavity and divides the cavity into a first chamber proximate to the first end and a second chamber proximate to the second end. The second chamber is fluidly isolated from an environment around the body. A lubricant is disposed within the first chamber. The main piston moves toward the first end of the body when a pressure in the second chamber is greater than a pressure of the environment. Movement of the main piston toward the first end of the body discharges lubricant through the at least one aperture.

In any embodiment, the pin further comprises a stop configured to limit travel of the main piston toward the first end of the body.

In any embodiment, the pin further comprises a seal associated with the second end cap and selectively isolating the second chamber from the environment.

In any embodiment, the pin further comprises a valve associated with the first end cap, wherein the valve is configured to selectively provide a path to fill the first chamber with lubricant.

In any embodiment, the first chamber is configured to receive lubrication when the second chamber is in fluid communication with the environment.

In any embodiment, receiving lubrication when the second chamber is in fluid communication with the environment drives the main piston toward the second end of the body.

In any embodiment, the pin further comprises a housing disposed within the first cavity, wherein the housing defines a second cavity. A secondary piston is slidably disposed within the second cavity and sealingly engages an inner surface of the housing. A rod is coupled at a first end to the main piston and at a second end to the secondary piston, so that movement of the main piston drives movement of the secondary piston.

In any embodiment, the valve is in fluid communication with the second cavity.

In any embodiment, the lubricant is disposed within the second cavity.

In any embodiment, a portion of the first chamber outside of the housing is in fluid communication with the environment.

In any embodiment, the pin further includes a one-way valve disposed within the housing and dividing the second cavity into a first cavity portion and a second cavity portion.

In any embodiment, the first cavity portion is proximate to the first end cap.

In any embodiment, the at least one aperture extending through the hollow body is in fluid communication with the second cavity portion.

In any embodiment, a landing gear assembly comprises a pinned joint with a disclosed pin.

In any embodiment, the landing gear assembly is mounted to one of an aircraft or a maglev vehicle.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

The following discussion provides examples of a self-lubricating pin suitable for use in a pinned joint subject to low or variable ambient pressure. In some examples, the pinned joint is a part of an aircraft, such as an aircraft landing gear system, wherein the ambient pressure to which the joint is subjected decreases and then increases during a flight cycle. In some examples, the pinned joint is part of a landing gear system for a maglev vehicle, wherein the maglev vehicle operates in a vacuum or low-pressure environment. In response to a reduced ambient pressure, embodiments of the disclosed pins discharge lubricant stored within the pins into the corresponding joint to provide ongoing lubrication of the joint.

FIGS. 1-8 illustrate various embodiments of a self-lubricating pin, generally designated 100, 300, and 400, formed in accordance with aspects of the present disclosure. In the illustrated embodiments, a cross-sectional views of the bodies of the pins are shown.

The disclosed pins are shown in simplified form that focuses on the self-lubricating features. As such, retention features, such as flanged ends, threaded retainers, i.e., nuts, snap rings, etc., that are known for retaining pins within a pinned joint are not shown. One of ordinary skill in the art will readily appreciate that the disclosed pins may include any known retention features, including but not limited to flanges, threaded retainers, snap rings, or any other suitable retention features, and such embodiments should be considered within the scope of the present disclosure.

Although some embodiments of the present disclosure will be described with reference to a self-lubricating pin for a pinned joint for an aircraft or a maglev vehicle, one skilled in the relevant art will appreciate that the disclosed embodiments are illustrative in nature and therefore should not be construed as limited to such an environment. It should therefore be apparent that the disclosed pins and components thereof have wide application, and therefore may be suitable for use within many types of environments in which pinned joints are employed. Accordingly, the following descriptions and any illustrations herein should not limit the scope of the claimed subject matter.

Figure 3:
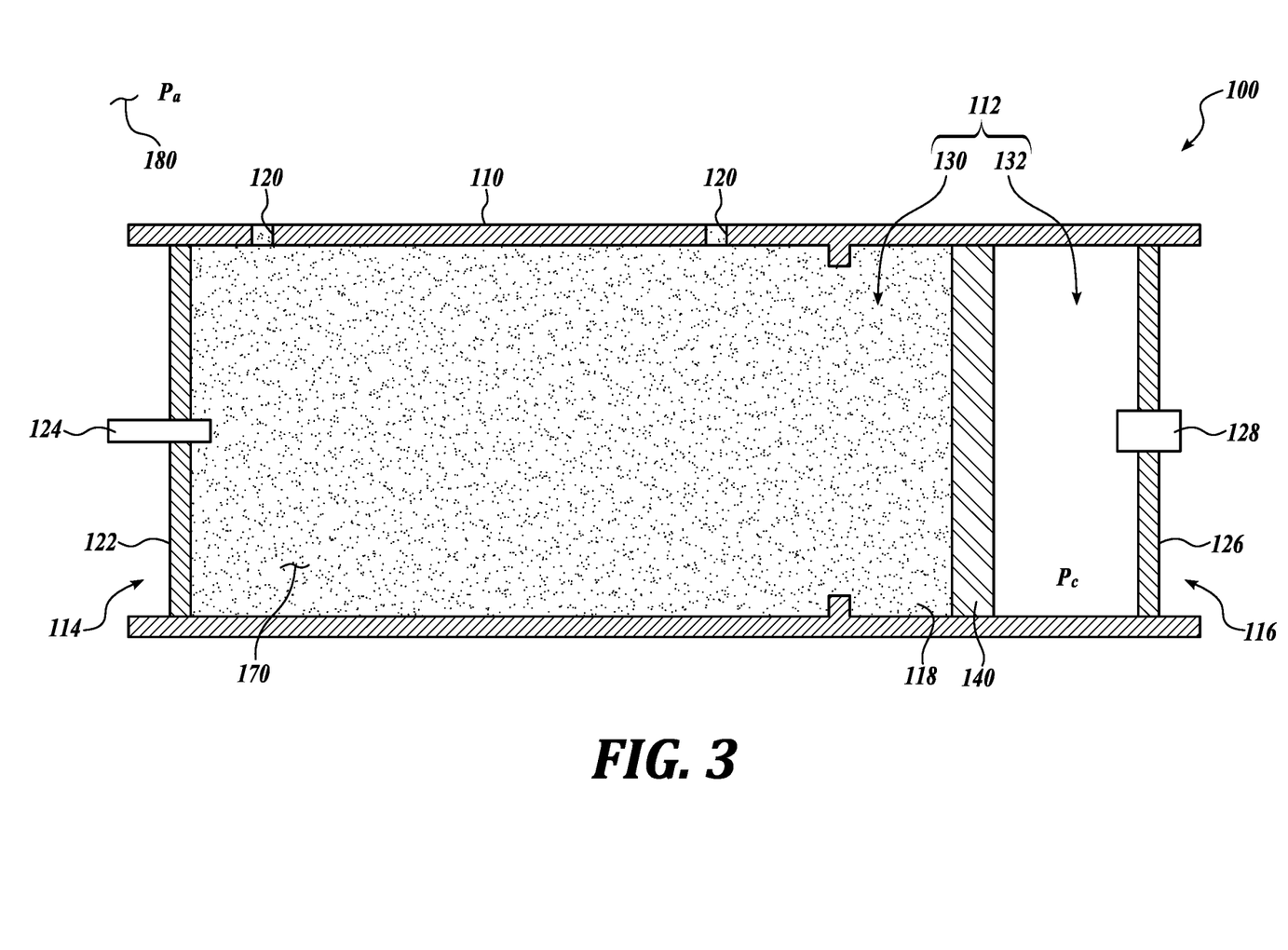
FIG. 3 is a cross-sectional view of a pin for a rotatable pinned joint in accordance with an embodiment of the present disclosure, wherein the pin includes a piston in a first position.
Figure 4:
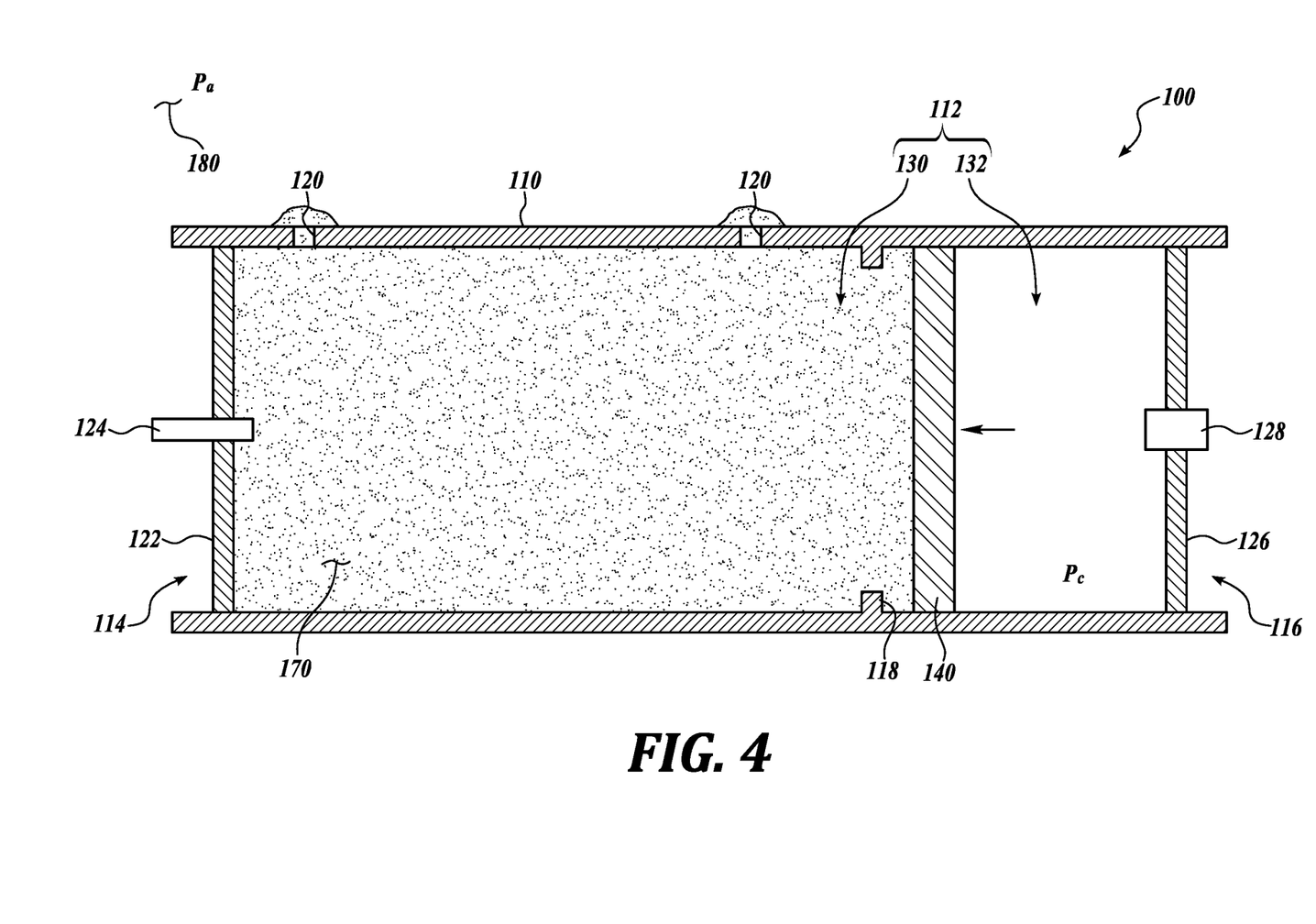
FIG. 4 is a cross-sectional view thereof, wherein the piston is in a second position.
Figure 5:
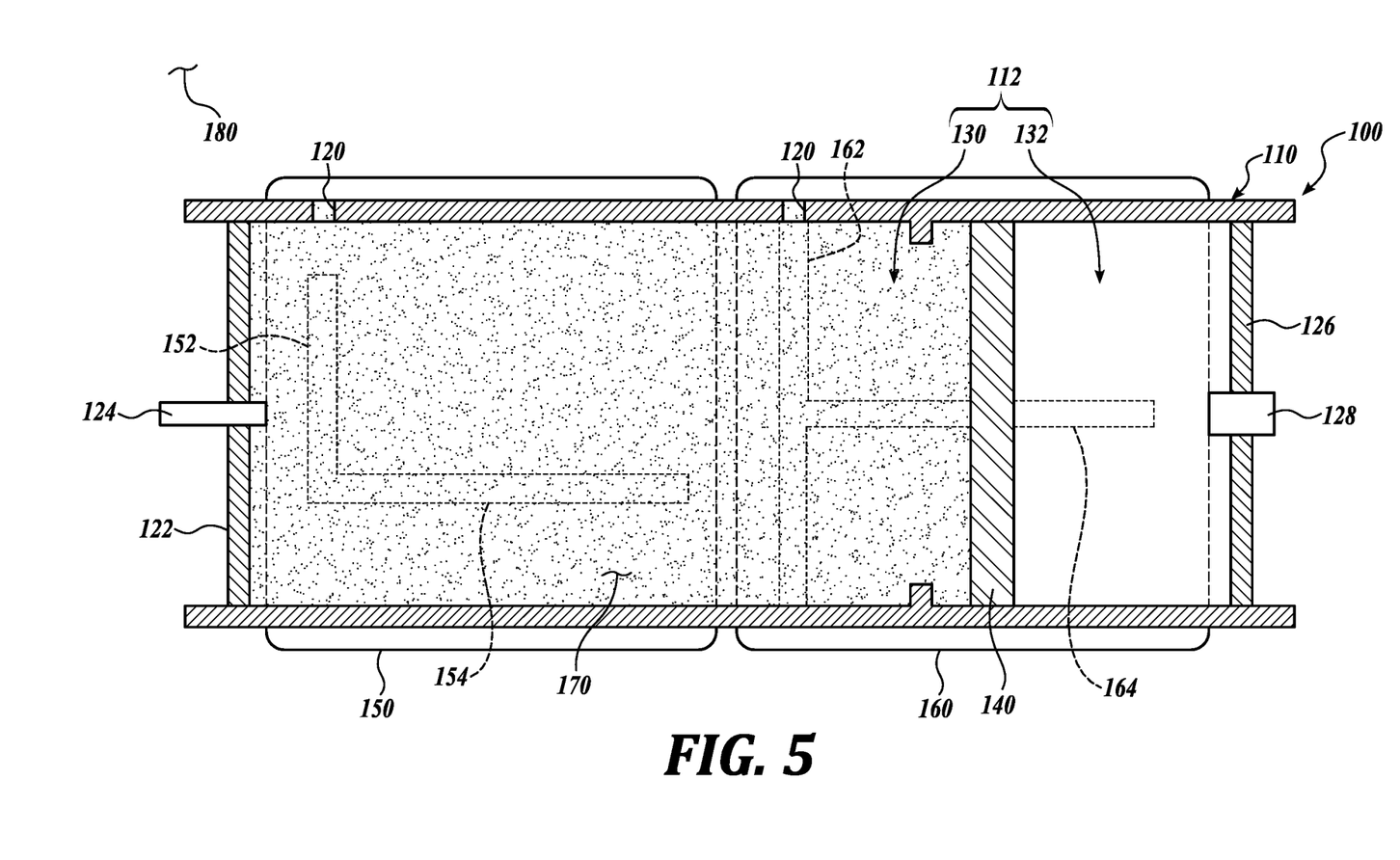
FIG. 5 is a cross-sectional view thereof, wherein the pin extends through a first bushing and a second bushing.

FIGS. 3-5 illustrate a representative embodiment of the pin 100 formed in accordance with one or more aspects of the present disclosure. The pin 100 is configured to provide continuous or intermittent lubrication to the associate pinned connection in response to a decrease in the pressure of the environment in which the pin operates.

The pin 100 includes a hollow cylindrical body 110 partially defining an internal cavity 112. In an embodiment, the body 110 is formed from steel, titanium, or any other suitable material or combination of materials.

A first end 114 of the body 110 is fluidly sealed by a first end cap 122 to delimit one end of the cavity 112. In some embodiments the first end cap 122 is secured to the body 110 be threaded engagement, interference fit, retaining ring or rings, adhesive, welding, or any suitable means or combination thereof. In some embodiments, the first end cap 122 is integrally formed with the body 110. A second end 116 of the body 110 is fluidly sealed by a second end cap 126, similar to the first end cap, to delimit the other end of the cavity 112.

A piston 140 is slidingly disposed within the cavity 112 and sealingly engages the walls of the cavity walls to divide the cavity 112 into a first chamber 130 and a second chamber 132. A stop 118 limits movement of the piston 140 toward the first end 114 of the body 110. In the illustrated embodiment, the stop 118 is circumferential protrusion extending radially inward from the wall of the cavity 112. In some embodiments, the stop 118 is a transitional step between a portion of the cavity having a first diameter and a portion of the cavity having a second diameter. In some embodiments, the stop is any feature that prevents movement of the piston 140 toward the first end of the body 110 beyond a predetermined position.

A fill valve 124 is mounted to the first end cap 122 to provide a means for introducing a lubricant 170, such as grease or another suitable lubricant, into the first chamber 130. In some embodiments, the fill valve is a standard grease fitting. In some embodiments, a removable plug and corresponding aperture through the first end cap 122 function as a fill valve. In some embodiments, the first end cap 122 is removable to enable the first chamber 130 to be filled with lubricant 170. The first end cap 122 is then remounted to the body after the first chamber has been filled. In some embodiments, the pin 100 includes any suitable feature to enable the first chamber 130 to be filled with lubricant 170.

One or more apertures 120 extend radially through the body 110 of the pin 100 to put the first chamber 130 in fluid communication with the environment 180, i.e., the area surrounding the pin 100. As will be described in further detail, lubricant 170 is discharged through the apertures in response to external pressure changes to lubricate the joint, i.e., to lubricate the outer surface of the pin 100 and the corresponding parts of the joint that rotatably engage the pin.

The second chamber 132 is filled with a gas, such as air. During normal operation, the second chamber is hermetically sealed, i.e., fluidly isolated from the environment.

When the pin 100 is initially installed or serviced, the first chamber 130 is filled with lubricant 170 that is to be distributed to the joint during service. To fill the first chamber 130 with lubricant 170, the seal 128 on the second end cap 126 is removed so that the second chamber 132 is in fluid communication with surrounding environment 180. As a result, the pressure $P_c$ within the second chamber 132 is equal to the ambient pressure $P_a$ of the surrounding environment 180.

With the second end cap 126 removed, lubricant 170 is provided to the first chamber 130 through the fill valve 124. As the first chamber 130 is filled with lubricant 170, the lubricant drives the piston 140 toward the second end cap 126. As a result, the volume of the second chamber 132 decreases, while the pressure $P_c$ within the second cavity remains equal to the pressure $P_a$ of the surrounding environment 180. When the first chamber 130 is filled with lubricant, and as a result, the volume of the second chamber 132 is minimized, the seal 128 is re-mounted to the second end cap 126 to hermetically seal the second chamber.

In service, the pressure $P_a$ of the environment is reduced. For an aircraft, the pressure $P_a$ decreases as the aircraft altitude increases and maintains a decreased pressure for the duration of the flight. For a maglev vehicle, the pressure $P_a$ within the vacuum/low operating environment remains lower than the pressure $P_a$ of the environment 180 in which the pin 100 was filled with lubricant 170.

As the pressure $P_a$ of the environment decreases, the pressure $P_c$ within the second chamber 132 drives the piston 140 toward the first end 114 of the body 110, for example, from the position shown in FIG. 3 to the position shown in FIG. 4, so that the volume of the first chamber 130 decreases and the volume of the second chamber 132 increases. As the volume of the first chamber 130 decreases, lubricant 170 is discharged from the apertures 120 to lubricate the joint. The piston 140 continues to move toward the first end 114 of the body 110, thereby discharging lubricant 170 from the apertures 120, whenever the pressure $P_a$ of the environment is less than the pressure $P_c$ until the piston engages the stop 118 or the pin 100 is serviced, i.e., refilled with lubricant.

Referring now to FIG. 5, the pin 100 is shown installed through a first bushing 150 and a second bushing 160. The first bushing 150 includes a circumferential groove 152 extending partially around the interior of the bushing and aligned with one of the apertures 120 of the pin 100. As the pin 100 rotates relative to the bushing 150, the aperture 120 intermittently comes into fluid contact with the circumferential groove 152 so that lubricant 170 discharged from the aperture 120 fills the groove. One or more lateral grooves 154 extend from the circumferential groove 152 and receives lubricant 170 from the circumferential groove to be distributed between the bushing 150 and the pin 100.

The second bushing 160 includes a circumferential groove 162 extending entirely around the interior surface of the bushing and aligned with another of the apertures 120 of the pin. Like the circumferential groove 162 receives lubricant 170 discharged from the first chamber 130 and distributes the lubricant 170 to one or more lateral grooves 164 extending in an axial direction from the circumferential groove. Lubricant 170 in the one or more lateral grooves 164 lubricates the interface between the pin 100 and the bushing 160.

Figure 6:
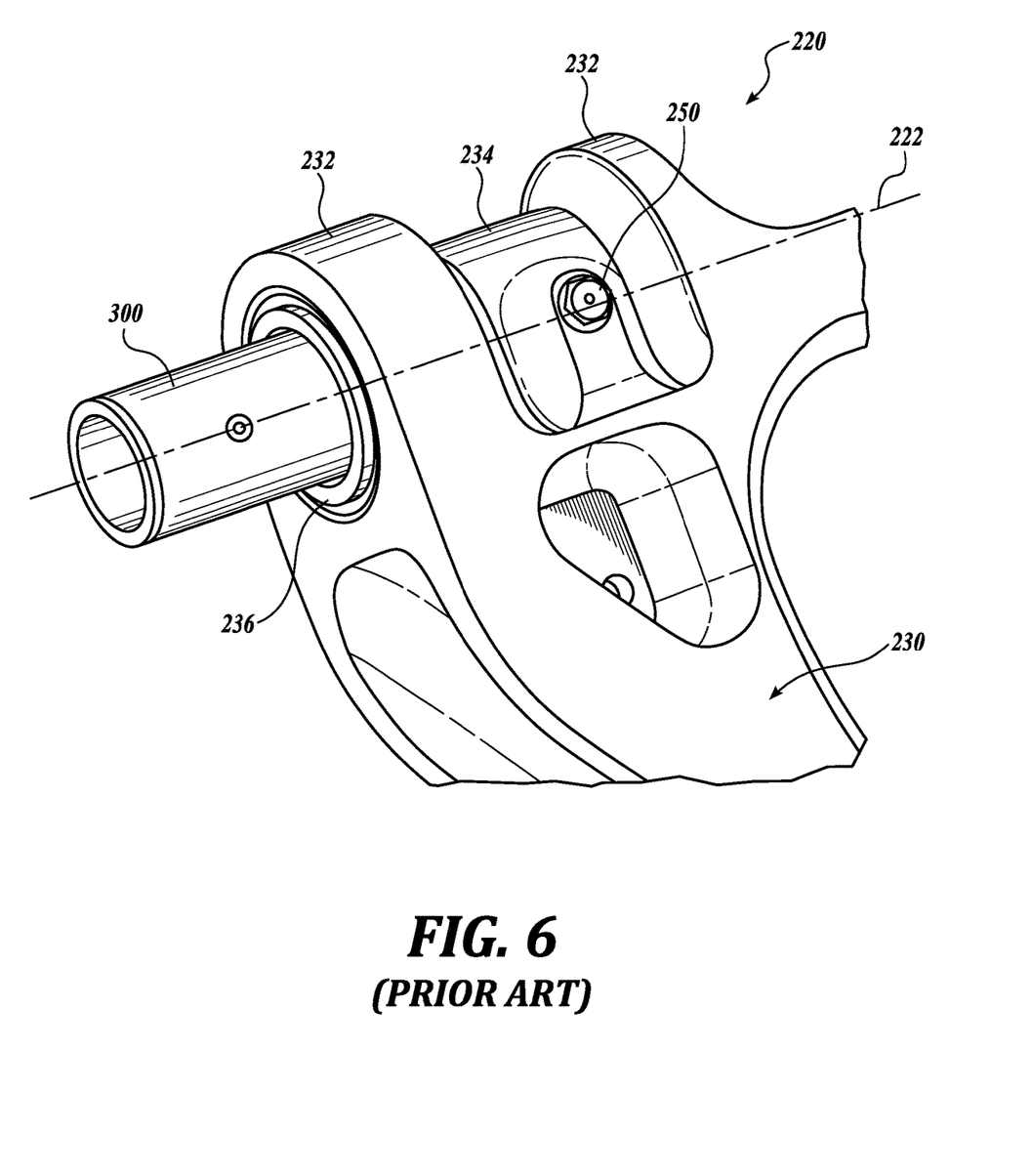
FIG. 6 is partial isometric view of a pinned joint that uses a retention pin to secure the pin to a component of the joint.

FIG. 6 shows a partial view of a known pinned joint 220 wherein a pin 300 is coupled to a fitting 230 by a retention pin 250. In the illustrated embodiment, the fitting 230 includes a pair of parallel lugs 232 connected by a central portion 234 extending therebetween. An aperture extends through the lugs with flanged bushings 236 mounted at each end. The pin 300 extends from each end of the fitting 230 and is configured to rotatably engage a corresponding fitting (not shown). The pin 300 is secured in rotation and translation along a central axis 222 by a retention pin 250 that extends laterally through both the pin 300 and the central portion 234 of the fitting 230.

Figure 7:
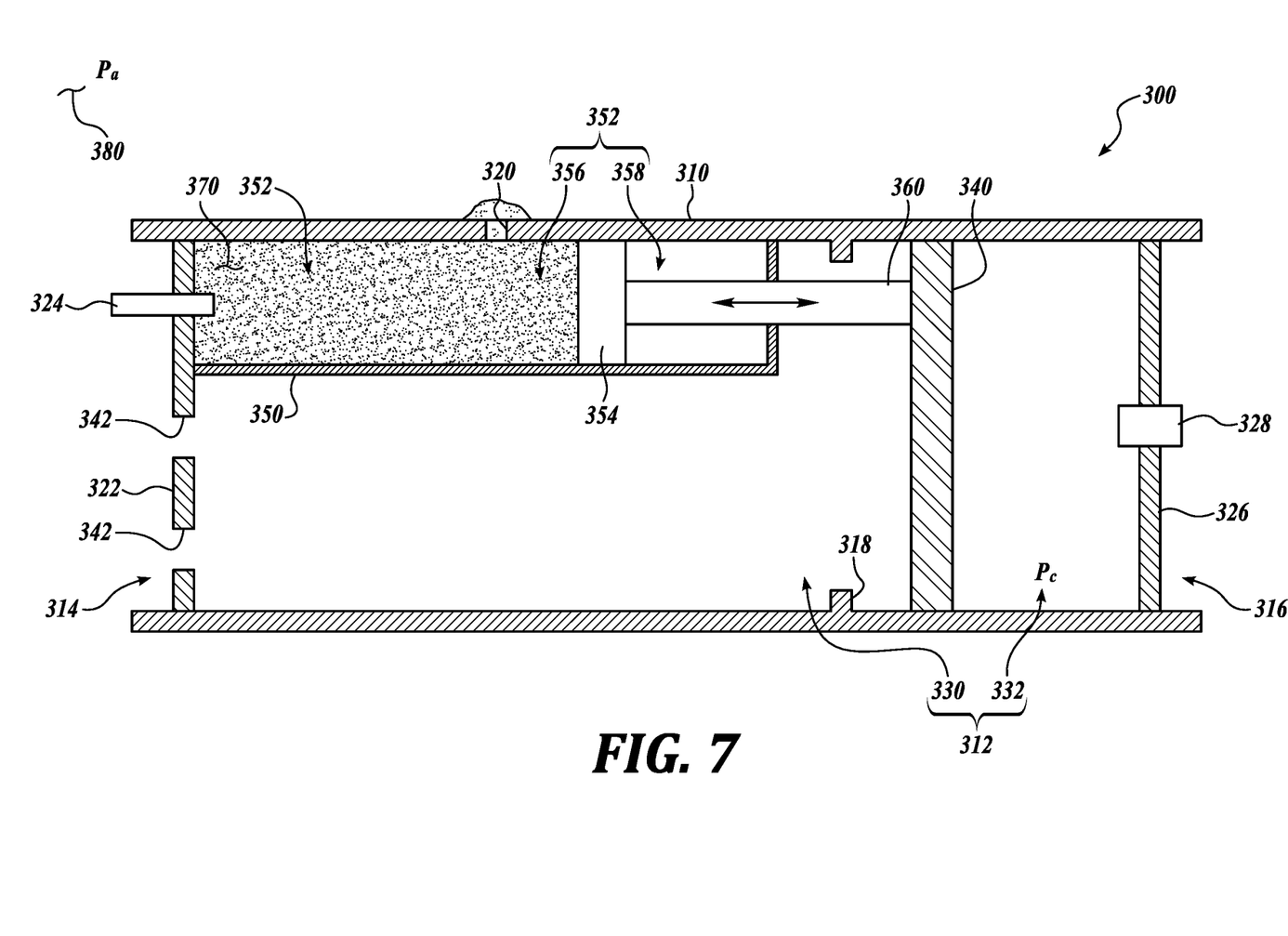
FIG. 7 is a cross-sectional view of the pin shown in FIG. 6.

FIG. 7 shows an embodiment of the pin 300 shown in joint 220 of FIG. 6. Similar to the pin 100 of FIGS. 3 and 4, the pin 300 includes a hollow body 310 that partially defines a cavity 312. A first end 314 of the body 310 is partially sealed by a first end cap 322 to delimit one end of the cavity 312. A second end 316 of the body 310 is fluidly sealed by a second end cap 326, similar to the first end cap 322, to delimit the other end of the cavity 312.

A piston 340 is slidingly disposed within the cavity 312 and sealingly engages the walls of the cavity walls to divide the cavity 312 into a first chamber 330 and a second chamber 332. A stop 318 limits movement of the piston 340 in the direction of the first end 314 of the body 310. Similar to the previously described stop 118, in some embodiments, the stop 318 is a circumferential protrusion extending radially inward from the wall of the cavity 310, a transitional step between a portion of the cavity 312 having different diameters; or any feature that prevents movement of the piston 340 toward the first end of the body 110 beyond a predetermined position.

Unlike previously described embodiments, a housing 350 is positioned within the second chamber 332 and defines a second cavity 352. A secondary piston 354 is slidingly disposed within the second cavity 352 and sealingly engages the inner wall of the second cavity 352 to divide the second cavity 352 into a first housing chamber 356 and a second housing chamber 358. One or more apertures 320 extend through the body 310 so that the first housing chamber 356 is in fluid communication with the environment 380 outside the pin 300.

Still referring to FIG. 7, the first end cap 322 sealingly engages the housing to delimit the first housing chamber 356. One or more apertures 342 are formed in the end cap 322 so that the portion of the first chamber 330 outside of the housing 350 is in fluid communication with the environment 380 surrounding the pin 300.

A fill valve 324 is mounted to the first end cap 322 proximate to the first housing chamber 356 to provide a means for introducing a lubricant 370, such as grease or another suitable lubricant, into the first housing chamber 356. In some embodiments, the fill valve is a standard grease fitting. In some embodiments, a removable plug and corresponding aperture through the first end cap 322 function as a fill valve. In some embodiments, the first end cap 322 is removable to enable the first housing chamber 356 to be filled with lubricant 370. The first end cap 322 is then remounted to the body 310 after the first housing chamber has been filled. In some embodiments, the pin 300 includes any suitable feature to enable the first housing chamber 356 to be filled with lubricant 370.

A rod 360 is coupled at one end to the (main) piston 340 and extends into the housing 350. The other end of the rod 360 is coupled to the secondary (housing) piston 354 so that movement of the piston 340 drives corresponding movement of the secondary piston 354.

When the pin 300 is initially installed or is serviced, the first housing chamber 356 is filled with lubricant 370 that is to be distributed to the joint during service. To fill the first housing chamber 356 with lubricant 370, the seal 328 on the second end cap 326 is removed so that the second chamber 332 is in fluid communication with surrounding environment 380. As a result, the pressure $P_c$ within the second chamber 332 is equal to the ambient pressure $P_a$ of the surrounding environment 380.

With the second end cap 326 removed, lubricant 370 is provided to the first housing chamber 356 through the fill valve 324. As the first housing chamber 356 is filled with lubricant 370, the lubricant drives the secondary piston 354 toward the second end cap 126, which in turn drives the piston 340 in the same direction by virtue of the pistons being connected by the rod 360. As a result, the volume of the second cavity 332 decreases, while the pressure $P_c$ within the second cavity remains equal to the ambient pressure $P_a$ of the surrounding environment 380. When the first housing chamber 356 is filled with lubricant 370, and as a result, the volume of the second chamber 332 is minimized, the seal 328 is re-mounted to the second end cap 336 to hermetically seal the second chamber 322.

During operation, the pressure $P_a$ of the environment decreases, and the pressure $P_c$ within the second chamber 332 drives the piston 340 and the secondary piston 354 toward the first end 314 of the body 310, so that the volume of the first housing chamber 356 decreases. As the volume of the first housing chamber 356 decreases, lubricant 370 is discharged from the apertures 320 to lubricate the joint. The piston 340 continues to move toward the first end 314 of the body 310, thereby discharging lubricant from the apertures, whenever the pressure $P_a$ of the environment is less than the pressure $P_c$ until the piston engages the stop 318 or the pin 300 is serviced, i.e., refilled with lubricant 370.

The apertures 342 formed in the first end cap 322 vent the first chamber 330 to the environment 380. Because the first chamber 330 vents to the environment 380, the pressure within the first chamber remains generally equal to the pressure $P_a$ of the environment 380. That is, compression of the air within the first chamber 330 is minimized, which reduces a force that would otherwise resist movement of the piston 340 toward the first end 314.

The inclusion of the housing 350 within the first chamber 330 limits the portion of the cavity 312 utilized for the self-lubrication feature of the pin 300. As a result, the disclosed configuration provides space through which a retention pin 250, such as the one of FIG. 6, can be inserted to secure the pin 300 to the fitting 230 without interfering with the function of the self-lubricating components. In some embodiments, the housing 350 has a diameter less than ½ the diameter of the first chamber 330 to allow a retention pin 250 to pass radially through the first chamber 330 without contacting the housing.

Figure 8:
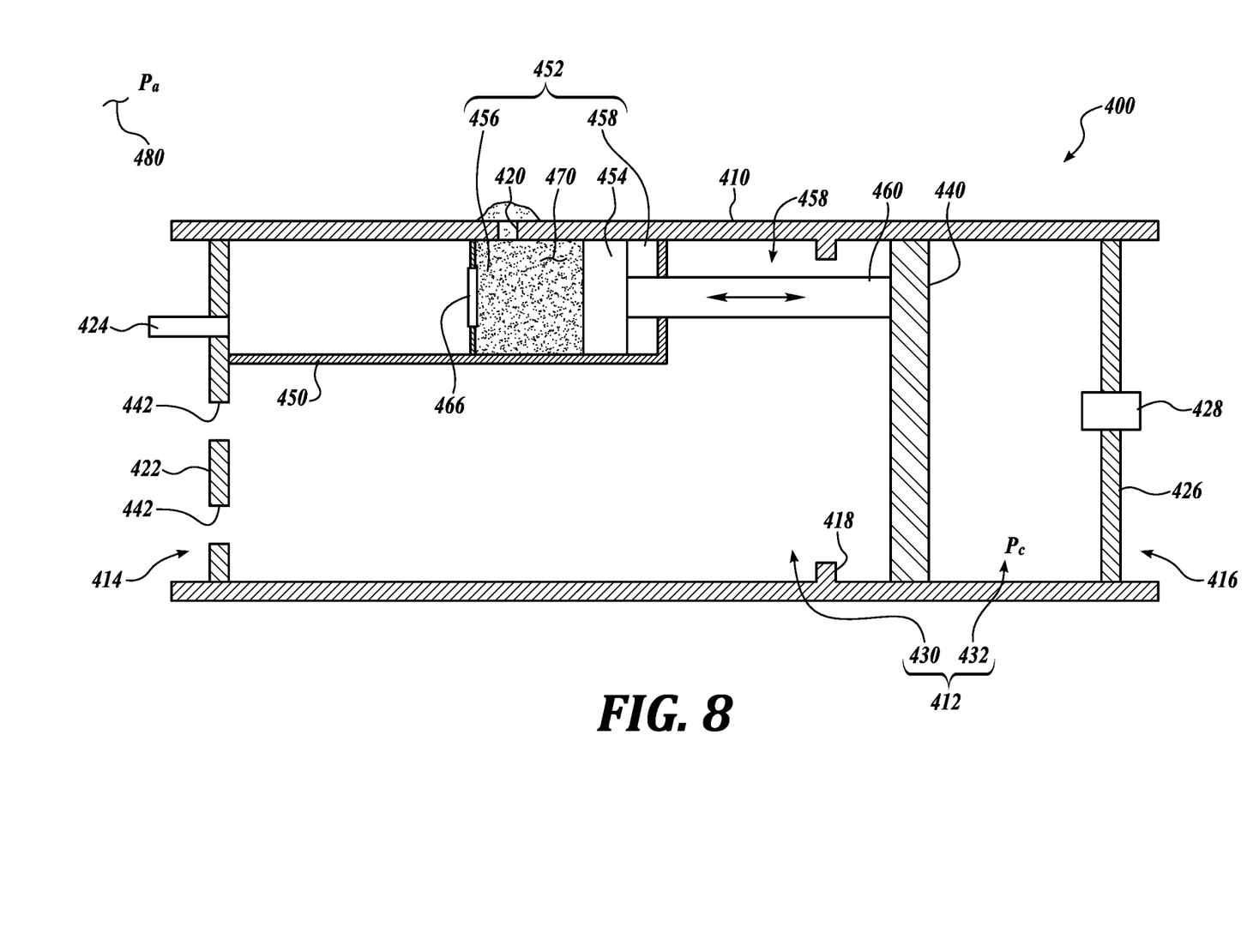
FIG. 8 is a cross-sectional view of another embodiment of the pin shown in FIG. 6.

FIG. 8 shows another embodiment of a pin 400 formed in accordance with aspects of the present disclosure. The pin 400 is similar to the pin 300 shown in FIG. 7, except as described below. For the sake of brevity, similar features and characteristics will not be described again with the understanding that features of the pin 400 identified by reference number 4XX correspond to similar features of pin 300 identified with reference number 3XX unless otherwise noted. For example, end cap 426 and piston 440 shown in FIG. 8 correspond to end cap 326 and piston 340, respectively, shown in FIGS. 7, unless otherwise noted.

In order to ensure that lubricant 470 is always present at the aperture 420, a one-way valve 466 is positioned in the housing 450 between the first end 414 and the aperture. When the housing 450 is being filled with lubricant 470, the valve 466 allows the lubricant to flow through the valve so that the lubricant is disposed between the valve and the secondary piston 454. When the secondary piston 454 is driven toward the first end 414 of the pin 400, the lubricant is prevented from moving toward the first end of the pin beyond the valve 466. That is, the lubricant 470 remains within the housing 450 near the aperture 420 so that movement of the secondary piston 454 more readily discharges the lubricant through the aperture.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A pin pivotably coupling a clevis arm to a lug of a second element, the pin comprising:
   a hollow cylindrical body with a first end cap coupled to a first end of the body and a second end cap coupled to a second end of the body, the body and the first and second end caps at least partially defining a cavity within the body, one of the first and second ends including an annular flange extending radially therefrom for seating against a first clevis arm lug, the other of the first and second ends including external threads formed thereon for receiving a nut which abuts a second clevis arm lug, the pin extending through aligned apertures in the first and second clevis arm lugs and the lug of the second element disposed therebetween;
   a piston slidably disposed within the cavity and dividing the cavity into a first chamber proximate to the first end and a second chamber proximate to the second end, wherein at least one aperture extends through the body and is in fluid communication with the first chamber, and the second chamber is fluidly isolated from an environment around the body;
   a valve comprising a standard grease fitting mounted to an aperture formed in the first end cap and fixedly positioned relative to the body, wherein the valve is configured to selectively provide a path to fill the first chamber with lubricant;
   a seal mounted to an aperture formed in the second end cap and configured to be removed selectively to enable fluid communication between the second chamber and the environment around the body; and
   a lubricant disposed within the first chamber,
   wherein, when a pressure in the second chamber is greater than a pressure of the environment, the piston moves within the cavity toward the first end of the body, and wherein movement of the piston toward the first end of the body discharges lubricant through the at least one aperture.

2. The pin of claim 1, further comprising a stop configured to limit travel of the piston toward the first end of the body.

3. The pin of claim 1, wherein the seal isolates the second chamber from the environment.

4. The pin of claim 1, wherein the first chamber is configured to receive lubrication when the seal is removed.

5. The pin of claim 4, wherein the first chamber receiving lubrication when the seal is removed drives the piston toward the second end of the body.

6. A landing gear assembly, comprising a pinned joint with the pin according to claim 1.

7. The landing gear assembly of claim 6 mounted to one of an aircraft or a maglev vehicle.

8. A pin for a pinned joint comprising:
   a hollow body with a first end cap coupled to a first end of the body and a second end cap coupled to a second end of the body, the body and the first and second end caps at least partially defining a first cavity within the body;
   a main piston slidably disposed within the first cavity and dividing the first cavity into a first chamber proximate to the first end and a second chamber proximate to the second end, wherein the first chamber is in fluid communication with an environment around the body through a first aperture, and the second chamber is fluidly isolated from the environment around the body;
   a housing disposed within the first chamber, the housing at least partially defining a second cavity;
   a secondary piston slidably disposed within the second cavity and sealingly engaging an inner surface of the housing to divide the second cavity into a first housing chamber and a second housing chamber, a second aperture extending through the housing and being in fluid communication with the first housing chamber;
   a rod coupled at a first end to the main piston and at a second end to the secondary piston; and
   a lubricant disposed within the first housing chamber,
   wherein movement of the main piston toward the first end of the body drives the secondary piston to discharge lubricant through the second aperture.

9. The pin of claim 8, further comprising a valve mounted to the first end cap and configured to selectively provide a path to fill the first housing chamber with lubricant.

10. The pin of claim 9, wherein the valve is in fluid communication with the second cavity.

11. The pin of claim 8, wherein a portion of the first chamber outside of the housing is in fluid communication with the environment.

12. The pin of claim 8, further comprising a one-way housing valve disposed within the housing and dividing the first housing chamber into a first chamber portion and a second chamber portion.

13. The pin of claim 12, wherein the first chamber portion is proximate to the first end cap.

14. The pin of claim 12, wherein the second aperture is in fluid communication with the second chamber portion.

15. A landing gear assembly, comprising a pinned joint with the pin according to claim 8.

16. The landing gear assembly of claim 15 mounted to one of an aircraft or a maglev vehicle.

* * * * *